INVENTORS.
ROSS W. COLEBROOK
SAM H. FELD
GERALD F. GOETZ

Jan. 12, 1965  R. W. COLEBROOK ETAL  3,164,956
TWO PART THRUST REVERSER
Filed March 14, 1963  6 Sheets-Sheet 2

INVENTORS.
ROSS W. COLEBROOK
SAM H. FELD
BY  GERALD F. GOETZ

AGENT

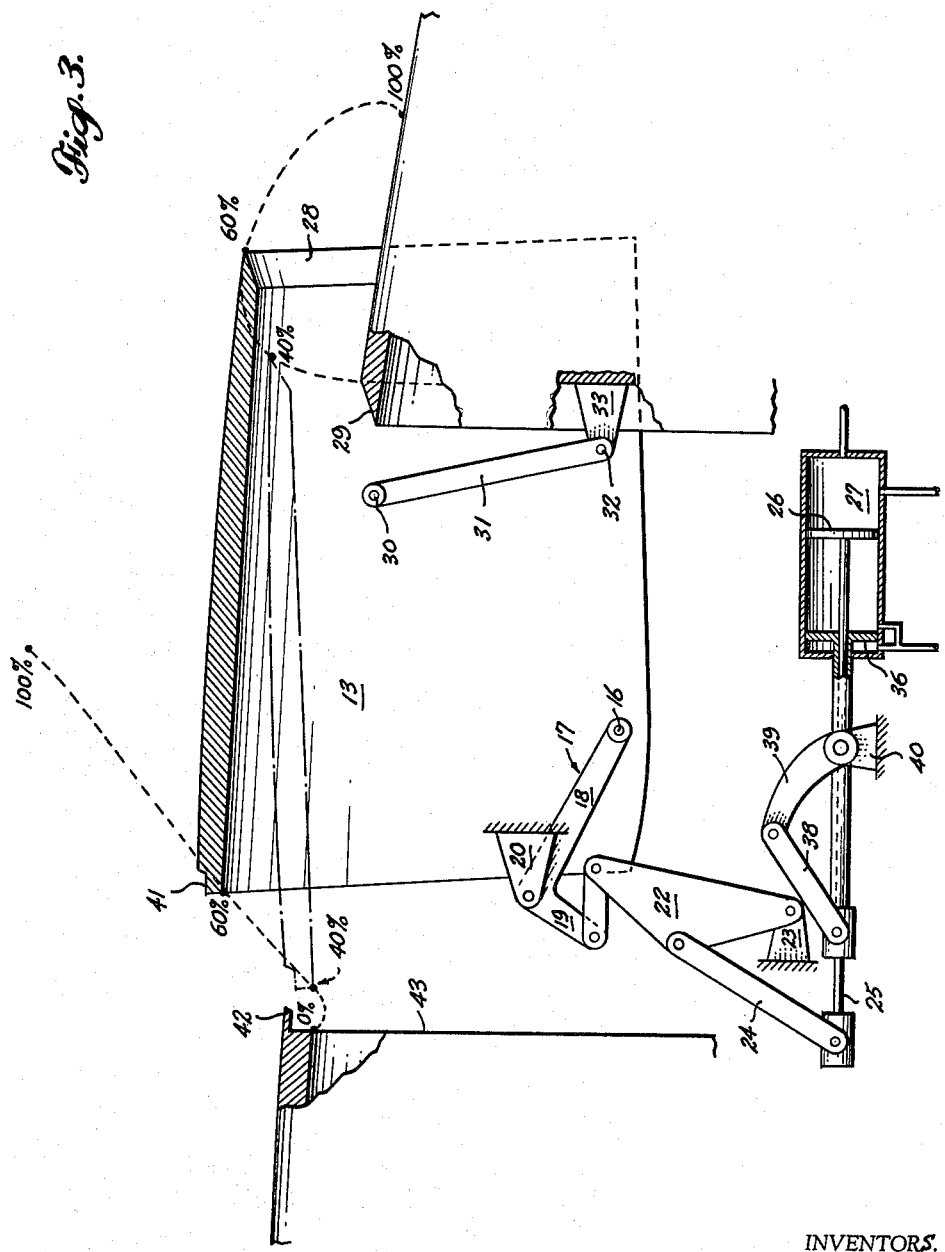

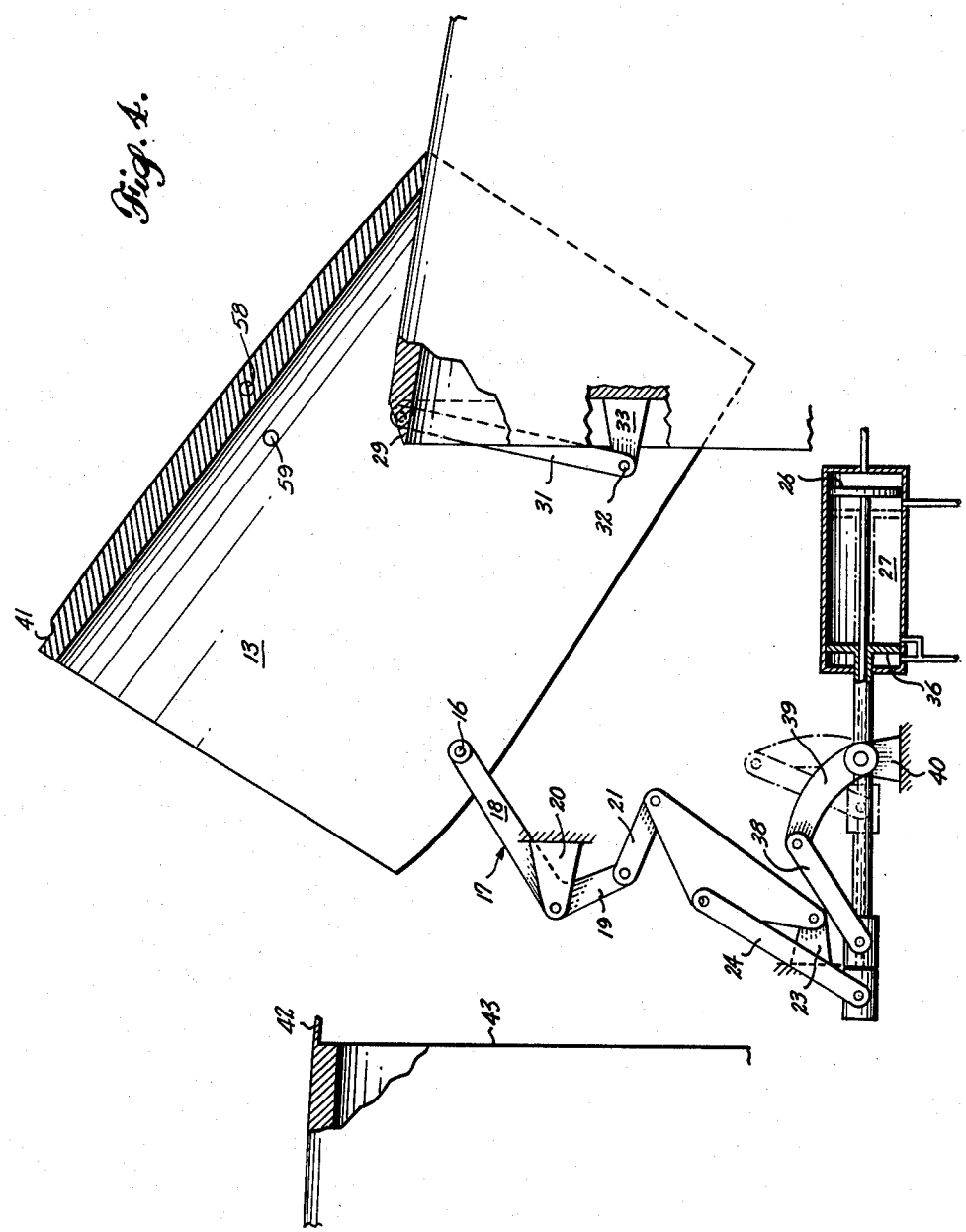

Jan. 12, 1965    R. W. COLEBROOK ETAL    3,164,956
TWO PART THRUST REVERSER
Filed March 14, 1963    6 Sheets-Sheet 5

INVENTORS.
ROSS W. COLEBROOK
SAM H. FELD
BY  GERALD F. GOETZ

AGENT

Jan. 12, 1965  R. W. COLEBROOK ETAL  3,164,956
TWO PART THRUST REVERSER
Filed March 14, 1963  6 Sheets-Sheet 6

INVENTORS.
ROSS W. COLEBROOK,
SAM H. FELD
BY  GERALD F. GOETZ

AGENT

United States Patent Office 3,164,956
Patented Jan. 12, 1965

3,164,956
TWO PART THRUST REVERSER
Ross W. Colebrook and Sam H. Feld, Bellevue, and Gerald F. Goetz, Seattle, Wash., assignors to The Boeing Company, Seattle, Wash., a corporation of Delaware
Filed Mar. 14, 1963, Ser. No. 265,205
10 Claims. (Cl. 60—35.54)

This invention pertains to a new two part thrust reverser for reaction propelled vehicles.

More particularly this invention pertains to a new thrust reverser comprising the combination of clamshells and deflector doors for forming a highly efficient, reliable, and fail safe two part thrust reverser. In addition the invention includes a particular sequence of operation of the deflector doors relative to the clamshell doors, and a novel sequence mechanism.

In the past the most efficient thrust reversers utilized clamshells and turning vanes, as was utilized on the Boeing 707 turbojet passenger transport aircraft during the first six years of its flight operation. With the use of a set of stationary vanes at the periphery of the nacelle skin for receiving the exhaust gases from the clamshells, a reverse thrust of substantially 30% of the forward thrust was obtained. The disclosed new thrust reverser utilizing deflector doors develops a reverse thrust of substantially 50% of the forward thrust. Further, it is peremptory that no ersatz for high reliability be incorporated in a thrust reverser for passenger carrying vehicles.

Accordingly a primary object of this invention is to provide a thrust reverser of greatly increased reliability and efficiency.

Another object of this invention is to provide a thrust reverser comprising a deflector door operable with a clamshell to produce highly increased reverse thrust efficiency.

A further object of this invention is to provide a thrust reverser having a deflector door pivotally mounted such that substantially no overturning moment exists on the door when in the reverse thrust position which would tend to move the door away from the reverse thrust position.

A still further object of this invention is to provide a thrust reverser comprising a clamshell, a deflector door, and linkage mounting the two elements for simultaneous movement from cruise position to reverse thrust position, and sequential movement from reverse thrust position to cruise position, the mounting linkage and the actuator linkage forming means for locking both the clamshell and deflector door in cruise position.

Another object of this invention is to provide a combination clamshell and deflector door thrust reverser having means for prevention of the slipstream from causing inadvertent displacement of the door.

Another object of this invention is to provide a combination clamshell and deflector door thrust reverser wherein mounting and actuating linkage is incorporated therewith for moving the deflector door trailing edge into the slipstream a greater distance than its leading edge during at least the first 50% of the movement thereof from the cruise position to the reverse thrust position whereby aerodynamic forces tend to close the deflector door during the majority of the door movement.

Other objects and various advantages of the disclosed two part thrust reverser will be apparent from the following detailed description, together with the accompanying drawings, submitted for purposes of illustration only and not intended to define the scope of the invention, reference being had for that purpose to the subjoined claims.

Briefly this invention includes a two part thrust reverser comprising basically a clamshell and a deflector door, and the additional elements of a single actuator and linkage pivotally connecting the elements together on a reaction propelled vehicle whereby the clamshell and deflector door are so pivotally mounted and actuatable from cruise position to reverse thrust position and return by the actuator that aerodynamic forces tend to close the deflector door during at least 50% of its movement and two different means are provided for locking the deflector door in cruise position.

The drawings diagrammatically illustrate by way of example, not by way of limitation, one form of the invention wherein like reference numerals designate corresponding parts in the several views in which:

FIG. 1, is a perspective view of the two part thrust reverser in reverse thrust position as viewed from below and forwardly;

FIGS. 2, 3, and 4, are schematic views of the sequential actuating linkage and one of the two deflector doors, as the right door for example, showing the new sequence of steps of rearward movement of the deflector door thru cruise position, 60% open position, and fully open or fully reverse thrust position, respectively, the clamshells and their connections to the actuating linkage being deleted for clarity of disclosure;

The invention disclosed herein is not limited in its application to the details of construction and arrangements of parts shown and described, since the invention is capable of other embodiments and of being practiced or carried out in various other ways. Also it is to be understood that the phraseology or terminology employed herein is for the purpose of description and not of limitation.

A very efficient, highly reliable and fail safe two part thrust reverser is disclosed comprising the combination of a clamshell and a deflector door and a novel activating mechanism for operating the two.

Figure 1:
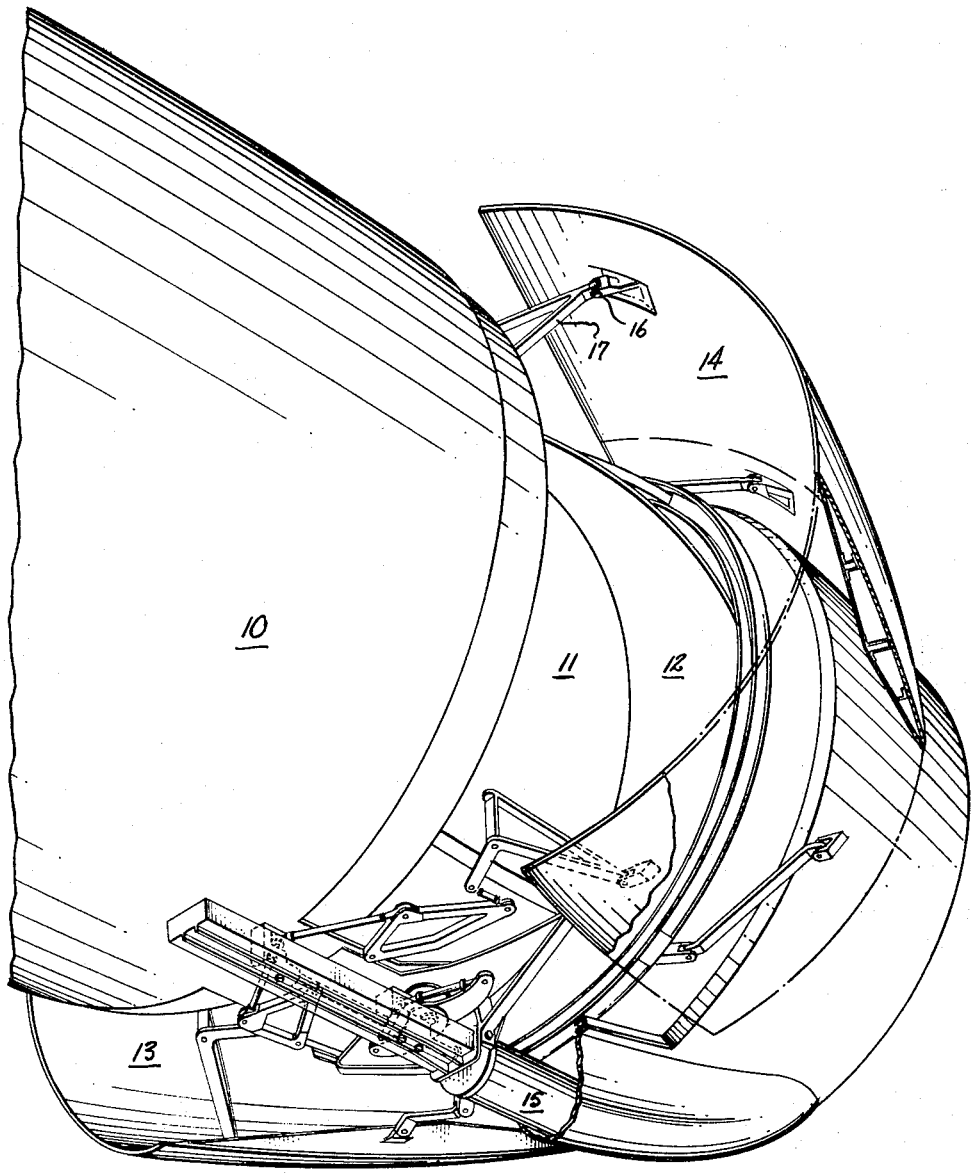

FIG. 1 illustrates the two part thrust reverser in the fully aft or reverse thrust position, all major parts being shown. This is a perspective view looking upwardly and aft of the thrust reverser as mounted on some aircraft. On side mounted reaction engines or the like, the thrust reverser may be rotated 90 degrees for mounting on the top and bottom of the engine, if so desired. For use with a reaction propulsion unit 10, as a turbojet engine, FIG. 1, on a vehicle, such as but not limited to an aerospace vehicle as an airplane, space vehicle, etc., or on a water vehicle, clamshells 11 and 12, illustrated in both FIG. 1 and FIG. 5, as well as deflector doors 13 and 14, FIG. 1, are pivotally connected to the double actuator 15 for operation in the desired and proper sequence as disclosed in greater detail hereinafter.

Likewise while a pair of clamshells and a pair of deflector doors are illustrated in the preferred embodiment, obviously the clamshells may be so shaped or utilized that only one is required per engine and only one deflector door per engine may be utilized, as where 2 jet engines are mounted in a single pod for example, or a single clamshell and deflector door may be mounted symmetrically on each side of the vehicle. While only one clamshell and deflector door will be described subsequently in detail the same applies to a pair of each, when so required.

The upper deflector door 13, illustrated in solid lines in FIG. 2 in cruise position is supported by pin 16, pivotally connecting the lower forward end of the door to the long arm 18 of a bellcrank 17. The bellcrank 17 is pivotally mounted at its apex on aircraft fixed structural flange or lug 20 and its short arm 19 is pivotally connected to a second bellcrank 22 through a link 21, which second bellcrank is pivotally mounted on aircraft structural lug 23. A link 24 interconnects bellcrank 22 with door actuating connecting rod 25, the latter being actuated by piston 26 operable in cylinder 27 of the double actuator 44.

The rear most end 28, FIG. 3, of the deflector door is in close proximity to surface 29 of the aircraft structure when in closed position, as illustrated in FIG. 2 but not necessarily supported by the surface. Pin 30, the principal support for the deflector door, pivotally connects link 31 to the rear position of the door 13 and pin 32 pivotally connects the link to aircraft fixed structural lug 33 for guiding the rearward portion of the door upon opening and closing thereof.

Accordingly upon movement of piston 26 to the right, as viewed in FIG. 2, piston rod 25 with link 24 rotates bellcrank 22 clockwise to rotate bellcrank 17 counter clockwise and likewise to apply a rearward force on forward pin 16 for pivoting the deflector door about its aft supporting pin 30 initiating a lowering movement of the front portion of the door and simultaneously initiating an upward movement of the aft portion of the door.

The broken line path 34, FIG. 2 illustrates the movement of the leading edge of the deflector door and the broken line path 35 illustrates the movement of the trailing edge of the deflector door as the door moves between its retracted position and its extended or reverse thrust position. Likewise three examplary points 0%, 60%, and 100% or percentages of travel to the fully opened position are identified on each of the broken line paths indicating the location of the door leading and trailing edges when the door is at the closed position, the 60% open position, and the 100% open position, respectively. FIGS. 2, 3, and 4 illustrate in solid lines the door in the above three respective positions.

FIG. 3 in addition to illustrating the deflector door at the 60% open position also shows the door in broken lines at the 40% open position. As is readily seen in FIG. 3, during extension of the deflector door from retracted position the trailing edge of the door is moved into the slip-stream a greater distance than its leading edge during slightly over 60% of its travel or during the majority of the movement thereof from the retracted position to the reverse thrust position whereby aerodynamic forces tend to close the door during at least the first 50% of the door movement.

Figure 5:
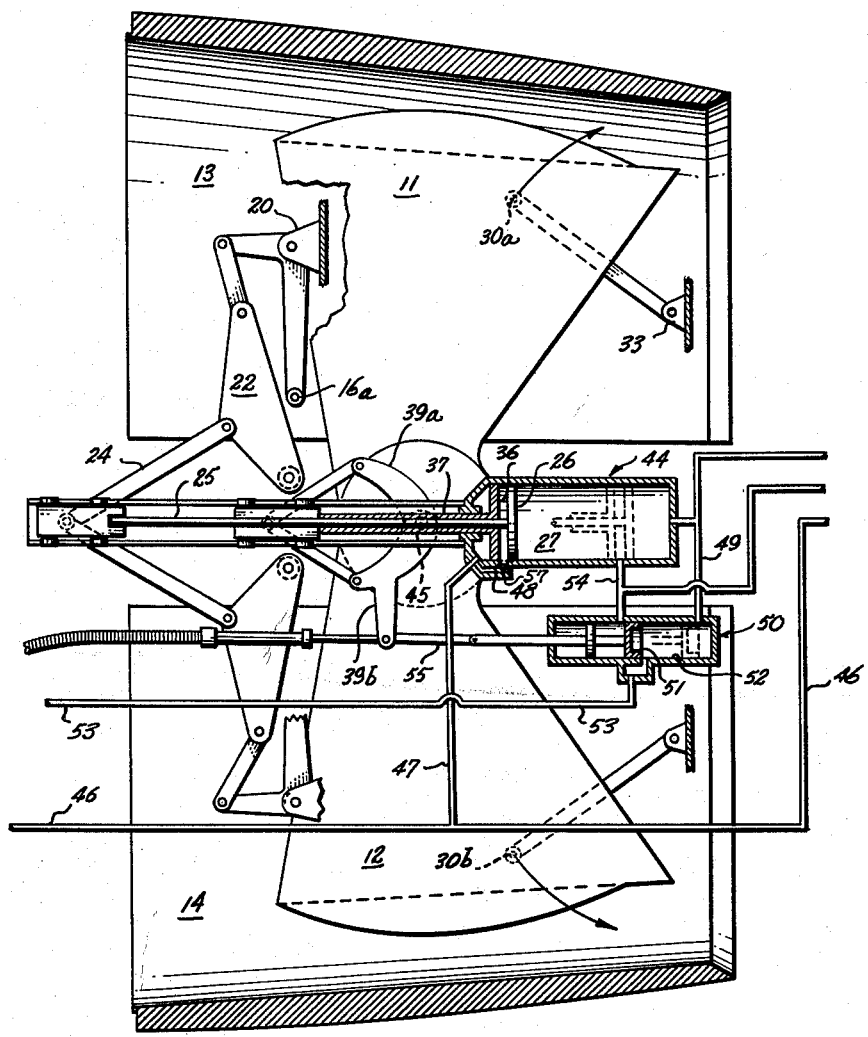
FIG. 5, is a schematic view of a horizontal section, with parts in section, of the two part thrust reverser with the actuator illustrated in cruise position in solid lines, and in reverse thrust position in broken lines.

The clamshells are actuated by second piston 36, FIG. 2, having sleeve type connecting rod 37 collinear with and telescopically receiving the other connecting rod 25 and pivotally connected with pin 56 to a link 38 for driving arm 39 fixed to the clamshells 11, 12, FIG. 5, the clamshell arms being pivotally supported on aircraft structural lug 40.

FIG. 2, 3, and 4, likewise illustrate a means for preventing the slipstream from passing under the deflector door leading edge while it is in retracted position and causing inadvertent displacement of the door to reverse thrust position. This means comprises a recessed projection 41 on the leading edge of the deflector door for tucking under a rearward extension 42 of the aircraft skin structure at the forward periphery of the door opening 43.

A feature of this thrust reverser is the location of the deflector door forward and aft supporting pivots 16 and 30, respectively as the door movement is controlled by the supporting 4-bar linkage 17 and 31. As is illustrated in FIG. 4, the supporting linkage for the deflector door provides an instantaneous center or center of support 58 for the door when in the open position that is near the center of load or center of fluid pressure 59. This provides a substantially stable door which tends to neither close nor open farther. The instantaneous center or the center of support 58 is the intersection of the extension of the fore and aft support links, 17 and 31, respectively, of the 4-bar linkage in the door open position. The center of fluid pressure or center of load 59 is the resultant of both the passing air stream or the slip stream and of the gas load from the reverser or deflected exhaust gases. Because the two points 58 and 59 are so close together, turning moments about either are considered negligible, and thus a substantially stable deflector door results during thrust reversing.

FIG. 5 discloses the novel sequence deflector door and clamshell two part thrust reverser double actuator 44 wherein the deflector doors 13 and 14 supported on forward and aft pivot pins 16a, 30a, and 16b (not shown), 30b, respectively are actuated by piston 26, and clamshells 11 and 12 pivotal about a pivot pin 45 are actuated by piston 36.

Any suitable fluid, such as air under pressure is supplied to fluid pressure line 46 from any suitable controlled source, not shown, for pressurizing line 47 and the left side of piston 36. Line 48 is likewise exposed to pressure but due to a restriction, such as but not limited to, a check valve 57, FIG. 6, the fluid flow is thus restricted from passing to the space between pistons 26 and 36. Pressure line 46 likewise continues on to a similar thrust reverser actuator (not shown) on the other side of the thrust reverser for simultaneous operation thereof. Piston 36 is actuated to the right, contacting piston 26 and both pistons continuing to the right until the deflector doors and the clamshells reach the reverse thrust position, or the extreme limiting position shown in broken lines in FIG. 5 and in solid lines in FIG. 6. The fluid is exhausted through fluid line 49, FIG. 5, through actuator sequence valve 50, and out fluid line 53, until piston 51 which is operably connected to piston 36 by rod 55, arm 39, link 38, FIGS. 2–4, and piston rod 37, FIG. 5 moves to the right creating a passage for connecting line 54 to line 53 within valve 50, the fluid thereafter being exhausted through fluid line 54, through actuator sequence valve 50 and out fluid line 53. Both the deflector door and the clamshell would now be in reverse thrust position as illustrated in FIG. 1, and shown with the clamshell deleted in FIG. 4.

Figure 6:
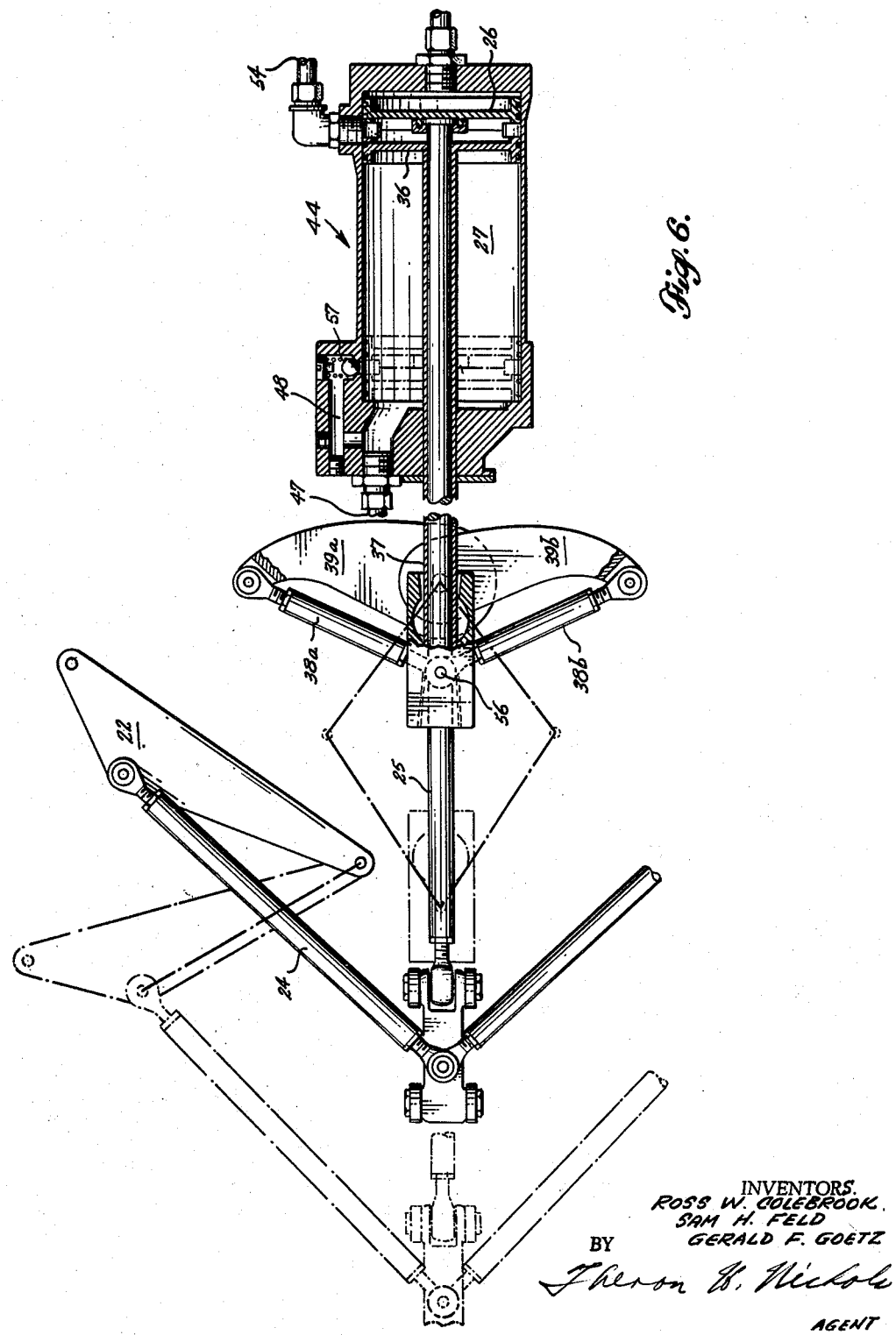
FIG. 6 is a horizontal schematic view, with parts in section, of the sequential actuator and linkage for operating the two part thrust reverser.

FIG. 6 discloses an enlarged view and additional details of the preferred compact double actuator 44 for operation of both the deflector doors and clamshells in providing a thrust reverser of increased reliability and efficiency. While the clamshell arms 39a and 39b which are rigidly attached to the clamshells 11 and 12, respectively are shown schematically in FIG. 5, the preferred embodiment of the arms and likewise their respective connecting links 38a and 38b are shown in greater detail in FIG. 6. Accordingly, a thrust reverser is provided having increased reliability and efficacy. Also a spring and ball check valve 57 is disclosed to insure full movement of piston 26 back to its retracted position during the retraction cycle as explained below.

In operation of the two part thrust reverser, the clamshells 11 and 12, FIG. 5, in the cruise or retracted position are open for allowing the engine exhaust gases to freely exit and the deflector doors, FIGS. 2–4, are locked down with recessed projection and extension lock 41, 42 and provide an aerodynamically smooth closure over the thrust reverser and is secured thereover against inadvertent displacement, and overcenter toggle links 21, 22 likewise lock the door closed.

To extend the thrust reverser, appropriate valves (not shown) are operated for applying high pressure fluid to line 45 simultaneously actuating the clamshell piston 36 and deflector door piston 26 to the extreme right. As shown in FIGS. 2–4, the deflector door is urged closed through at least 50% of the rearward travel thereof due to the door leading edge being tilted inwardly towards the skin surface of the aircraft to slightly beyond 60% of its travel to open position. Upon the deflector door reaching the 100% or fully opened position, aerodynamic pressure maintains the door open.

The exhaust gases are then deflected forwardly and outwardly by the clamshells and additional forward deflection is appied to the exhaust gases by the deflector doors 13 and 14.

To retract the two part thrust reverser, fluid under pressure is applied to line 53, FIG. 5, the fluid passing transversely across actuator cylinder 52, through line 54, and into actuator cylinder 27, and between pistons 36 and 26 to actuate piston 36 to the left. As the clamshells are rotated to cruise position, actuator sequence valve piston 51 is likewise moved to the left. Upon clamshell piston 36 reaching the extreme left positon where the clamshells are in cruise position, passage 48 is uncovered to exhaust the pressure fluid from between the two pistons and out through lines 47 and 46. Likewise piston 51 has been moved to its extreme left position to divert the pressure fluid from cylinder 52 through line 49 to the right side of deflector door actuator piston 26. As pressure fluid enters the actuator cylinder 27 from line 49, piston 26 is moved to the extreme left thereby operating as shown in FIG. 2 the deflector door linkage 24, 22, 21, and 17 to retract the deflector door to cruise and locked position. It may be noted that at least the last 50% of travel of the deflector door is effortless in that the aerodynamic forces are likewise urging the door closed.

As the deflector door linkage moves to the extreme left or cruise position, FIGS. 2–4, bellcrank 22 is moved to the left so that a straight line connecting the pivot between crank 22 and lug 23 and the pivot between crank arm 19 and link 21 passes to the right of the pivot between crank 22 and link 21. This passing over center provides that any extraneous force tending to open deflector door 13 will tend to cause counter clockwise rotation of crank 22 which will be resisted by bottoming of pistons 26 and 36 in cylinder 27, thus locking both deflector doors 13 and 14, FIG. 5, and clamshell doors 11 and 12 in the cruise position.

Accordingly a highly reliable and efficient clamshell and deflector door thrust reverser is provided having proper sequential linkage means and at least two locking means for preventing inadvertent displacement of the deflector doors and the clamshells from their retracted or cruise position.

While only one embodiment of the invention has been described in the specification and shown in the accompanying drawings, it will be evident that various other modifications are possible in the arrangement and construction of the disclosed two parts thrust reverser without departing from the scope of the invention.

We claim:

1. A thrust reverser for a reaction propelled vehicle comprising the combination of,
   (a) a reaction engine,
   (b) structure for supporting said engine on the vehicle,
   (c) a clamshell pivotally mounted on said supporting structure for reversing the flow of exhaust gases from said engine,
   (d) a deflector door having leading and trailing edges,
   (e) connecting link means for mounting said deflector door on said supporting structure for receiving the reverse flow of exhaust gases from said clamshell, and
   (f) actuator means for operating both said clamshell and said deflector door between a cruise position and a reverse thrust position,
   (g) said connecting link means comprising means for moving said deflector door trailing edge into the slipstream a greater distance from said engine supporting structure than said deflector door leading edge during the initial movement thereof from the cruise position to the reverse thrust position whereby aerodynamic forces tend to close said deflector door when inadvertently displaced.

2. A thrust reverser for a reaction propelled vehicle comprising the combination of,
   (a) a reaction engine,
   (b) structure for supporting said engine on the vehicle,
   (c) a clamshell pivotally mounted on said supporting structure for reversing the flow of exhaust gases from said engine,
   (d) a deflector door having leading and trailing edges,
   (e) connecting link means for mounting said deflector door on said supporting structure for receiving the reverse flow of exhaust gases from said clamshell, and
   (f) actuator means for operating both said clamshell and said deflector door between a cruise position and a reverse thrust position,
   (g) said connecting link means including pivotal support means between said deflector door and said support structure for providing a center of support adjacent to the center of fluid pressure of said door for generating substantially negligible moments tending to rotate said door away from the reverse thrust position.

3. A thrust reverser for a reaction propelled vehicle comprising the combination of,
   (a) a reaction engine,
   (b) structure for supporting said engine on the vehicle,
   (c) a clamshell pivotally mounted on said supporting structure for reversing the flow of exhaust gases from said engine,
   (d) a deflector door having leading and trailing edges,
   (e) connecting link means for mounting said deflector door on said supporting structure for receiving the reverse flow of exhaust gases from said clamshell, and
   (f) actuator means for operating both said clamshell and said deflector door between a cruise position and a reverse thrust position,
   (g) said connecting link means including forward and aft pivots for substantially providing coincidence of the deflection door instantaneous center and center of pressure whereby overturn moment of said deflector door about said pivot due to the exhaust gases is substantially negligible when said deflector door is in reverse thrust position.

4. A thrust reverser for a reaction propelled vehicle comprising the combination of,
   (a) a reaction engine,
   (b) structure for supporting said engine on the vehicle,
   (c) a clamshell pivotally mounted on said supporting structure for reversing the flow of exhaust gases from said engine,
   (d) a deflector door having leading and trailing edges, and at least one pivotal support,
   (e) connecting link means for mounting said deflector door on said supporting structure for receiving the reverse flow of exhaust gases from said clamshell, and
   (f) actuator means for operating both said clamshell and said deflector door between a cruise position and a reverse thrust position,
   (g) said connecting link means comprising toggle lock means for locking said deflector door in the cruise position,
   (h) said toggle lock means comprising first, second, and third links, one end of said first link being connected to said deflector door pivotal support, one end of said third link being connected to said supporting structure, said second link being linearly interconnected between said first and third links, and said actuator means being connected to said third link for locking said deflector door pivotal support in the cruise position.

5. A thrust reverser for a reaction propelled vehicle comprising the combination of,
   (a) a reaction engine,
   (b) structure for supporting said engine on the vehicle, (c) a clamshell pivotally mounted on said supporting structure for reversing the flow of exhaust gases from said engine,
(d) a deflector door having leading and trailing edges,
(e) connecting link means for mounting said deflector door on said supporting structure for receiving the reverse flow of exhaust gases from said clamshell, and
(f) actuator means for operating both said clamshell and said deflector door between a cruise position and a reverse thrust position,
(g) said supporting structure having a rearwardly projecting extension, and
(h) said means for mounting said deflector door comprising means for positioning said deflector door leading edge under said extension.

6. A thrust reverser for a reaction propelled vehicle comprising the combination of,
(a) a reaction engine,
(b) structure for supporting said engine on the vehicle,
(c) a clamshell pivotally mounted on said supporting structure for reversing the flow of exhaust gases from said engine,
(d) a deflector door having leading and trailing edges,
(e) connecting link means for mounting said deflector door on said supporting structure for receiving the reverse flow of exhaust gases from said clamshell, and
(f) actuator means for operating both said clamshell and said deflector door between a cruise position and a reverse thrust position,
(g) said connecting link means comprising means for forcing said deflector door trailing edge into the slipstream a greater distance from said supporting structure than said deflector door leading edge during at least 50% of the movement thereof between the cruise position and the reverse thrust position whereby aerodynamic forces tend to close said deflector door during at least 50% of the door movement.

7. A thrust reverser for a reaction propelled vehicle comprising the combination of,
(a) a reaction engine,
(b) structure for supporting said engine on the vehicle,
(c) a clamshell pivotally mounted on said supporting structure for reversing the flow of exhaust gases from said engine,
(d) a deflector door having leading and trailing edges,
(e) connecting link means for mounting said deflector door on said supporting structure for receiving the reverse flow of exhaust gases from said clamshell, and
(f) actuator means for operating both said clamshell and said deflector door between a cruise position and a reverse thrust position,
(g) said actuator means including two pistons,
(h) said pistons operating in a common cylinder, and
(i) fluid supply means for actuating said pistons together in one direction and sequentially in the opposite direction.

8. A thrust reverser for a reaction propelled vehicle comprising the combination of,
(a) a reaction engine,
(b) structure for supporting said engine on the vehicle,
(c) a clamshell pivotally mounted on said supporting structure for reversing the flow of exhaust gases from said engine,
(d) a deflector door having leading and trailing edges,
(e) connecting link means for mounting said deflector door on said supporting structure for receiving the reverse flow of exhaust gases from said clamshell, and
(f) actuator means for operating both said clamshell and said deflector door between a cruise position and a reverse thrust position,
(g) said actuator means comprising two pistons operable in a single cylinder,
(h) first and second telescopic piston rods connected to said pistons, said first piston rod being connected to said clamshell, and said second piston rod being connected to said deflector door, and
(i) said cylinder having fluid supply means for actuating said pistons together in one direction and sequentially in the opposite direction.

9. A thrust reverser for a reaction propelled vehicle comprising the combination of,
(a) a reaction engine,
(b) structure for supporting said engine on the vehicle,
(c) a clamshell pivotally mounted on said supporting structure for reversing the flow of exhaust gases from said engine,
(d) a deflector door having leading and trailing edges,
(e) connecting link means for mounting said deflector door on said supporting structure for receiving the reverse flow of exhaust gases from said clamshell, and
(f) actuator means for operating both said clamshell and said deflector door between a cruise position and a reverse thrust position,
(g) said connecting link means comprising means for forcing said deflector door trailing edge into the slipstream a greater distance from said supporting structure than said deflector door leading edge during the initial portion of the movement thereof between the cruise position and the reverse thrust position whereby aerodynamic forces tend to close said deflector door during the initial portion of the door movement.

10. A thrust reverser for a reaction propelled vehicle comprising the combination of,
(a) a reaction engine,
(b) structure for supporting said engine on the vehicle,
(c) a clamshell pivotally mounted on said supporting structure for reversing the flow of exhaust gases from said engine,
(d) a deflector door having leading and trailing edges,
(e) connecting link means for mounting said deflector door on said supporting structure for receiving the reverse flow of exhaust gases from said clamshell, and
(f) actuator means for operating both said clamshell and said deflector door between a cruise position and a reverse thrust position,
(g) said actuator means being a compact double actuator comprising a cylinder inclosing two pistons, said pistons being connected to two collinear connecting rods for actuating said respective clamshell and deflector door.

References Cited by the Examiner
UNITED STATES PATENTS

| | | | |
|---|---|---|---|
| 1,288,937 | 12/18 | Leinweber | 244—104 |
| 2,551,246 | 5/51 | D'Arcey | 91—167 |
| 2,577,462 | 12/51 | Hackney | 91—181 X |
| 2,751,636 | 6/56 | Heinemann et al. | 244—129 X |
| 2,780,057 | 2/57 | Stavert | 60—35.54 |
| 2,849,861 | 9/58 | Gardiner et al. | 60—35.54 |
| 2,919,545 | 1/60 | Tschudy | 60—35.54 |
| 2,944,394 | 7/60 | Peregrine | 60—35.54 |
| 3,002,342 | 10/61 | Schatzki | 60—35.54 |
| 3,024,771 | 3/62 | Criffield et al. | 60—35.54 X |
| 3,034,296 | 5/62 | Keen et al. | 60—35.54 |
| 3,036,431 | 5/62 | Vdolek | 60—35.54 |

FOREIGN PATENTS

| | | |
|---|---|---|
| 745,720 | 2/56 | Great Britain. |
| 868,390 | 5/61 | Great Britain. |

SAMUEL LEVINE, *Primary Examiner.*